US007930536B2

(12) United States Patent
Takabayashi et al.

(10) Patent No.: US 7,930,536 B2
(45) Date of Patent: Apr. 19, 2011

(54) DEVICE-TO-DEVICE AUTHENTICATION SYSTEM, DEVICE-TO-DEVICE AUTHENTICATION METHOD, COMMUNICATION APPARATUS, AND COMPUTER PROGRAM (75) Inventors: Kazuhiko Takabayashi, Tokyo (JP); Takehiko Nakano, Kanagawa (JP); Yasuaki Honda, Chiba (JP); Tatsuya Igarashi, Tokyo (JP)

(73) Assignee: Sony Corporation, Tokyo (JP)

( * ) Notice: Subject to any disclaimer, the term of this patent is extended or adjusted under 35 U.S.C. 154(b) by 1007 days.

(21) Appl. No.: 10/520,736

(22) PCT Filed: Feb. 24, 2004

(86) PCT No.: PCT/JP2004/002113
§ 371 (c)(1),
(2), (4) Date: Jan. 10, 2005

(87) PCT Pub. No.: WO2004/100007
PCT Pub. Date: Nov. 18, 2004

(65) Prior Publication Data
US 2006/0069911 A1 Mar. 30, 2006

(30) Foreign Application Priority Data
May 12, 2003 (JP) ................. P2003-132902

(51) Int. Cl.
*H04L 29/06* (2006.01)
(52) U.S. Cl. ........ 713/153; 713/150; 713/168; 713/173; 726/2
(58) Field of Classification Search .................. 713/150, 713/168–173; 726/2–3, 9; 709/227–229
See application file for complete search history.

(56) References Cited

U.S. PATENT DOCUMENTS

| 5,884,298 | A  | * | 3/1999  | Smith et al. ....................... 707/2 |
|-----------|----|---|---------|---------------------------------------------|
| 6,463,265 | B1 | * | 10/2002 | Cohen et al. ................ 455/186.1 |
| 6,594,762 | B1 | * | 7/2003  | Doub et al. ..................... 726/35 |
| 6,606,707 | B1 | * | 8/2003  | Hirota et al. .................. 713/172 |
| 6,697,944 | B1 | * | 2/2004  | Jones et al. .................... 713/168 |
| 6,748,539 | B1 | * | 6/2004  | Lotspiech ....................... 726/20 |
| 6,842,115 | B1 | * | 1/2005  | Harris et al. ................ 340/572.1 |
| 6,854,062 | B2 | * | 2/2005  | Okamoto ........................ 726/12 |
| 7,010,600 | B1 | * | 3/2006  | Prasad et al. .................. 709/225 |
| 7,096,504 | B1 | * | 8/2006  | Tagawa et al. .................. 726/27 |
| 2001/0037452 | A1 | * | 11/2001 | Go et al. ....................... 713/168 |
| 2002/0038372 | A1 | * | 3/2002  | Idehara et al. ................. 709/227 |
| 2002/0073070 | A1 | * | 6/2002  | Morita et al. ..................... 707/1 |

(Continued)

FOREIGN PATENT DOCUMENTS

| JP | 10-271154   | 10/1998 |
|----|-------------|---------|
| JP | 2000-353143 | 12/2000 |
| JP | 2001-28592  | 1/2001  |
| JP | 2001-256345 | 9/2001  |
| JP | 2001-285284 | 10/2001 |

(Continued)

*Primary Examiner* — Beemnet W Dada
*Assistant Examiner* — Darren B Schwartz
(74) *Attorney, Agent, or Firm* — Finnegan, Henderson, Farabow, Garrett and Dunner, L.L.P.

(57) ABSTRACT

In view of the fact that devices connected on a home network are located in home, that is, at close range and therefore a user can physically access the devices within a relatively short period of time, identifying whether or not a home server for distributing the contents and a client terminal using the contents are connected to the same home network based on whether or not they can share access to the same physical medium within a short period of time. The authenticity of devices connected on a home network connected to an external network via a router is authenticated.

18 Claims, 5 Drawing Sheets

U.S. PATENT DOCUMENTS

| | | | |
|---|---|---|---|
| 2002/0161571 A1* | 10/2002 | Matsushima et al. | 704/200 |
| 2003/0046352 A1* | 3/2003 | Katsuda et al. | 709/206 |
| 2003/0078986 A1* | 4/2003 | Ayres et al. | 709/217 |
| 2003/0095524 A1* | 5/2003 | Stephens et al. | 370/338 |
| 2004/0203600 A1* | 10/2004 | McCorkle et al. | 455/411 |

FOREIGN PATENT DOCUMENTS

| | | |
|---|---|---|
| JP | 2002-073861 | 3/2002 |
| JP | 2002-281019 A * | 9/2002 |
| JP | 2002-542672 | 12/2002 |
| WO | WO 00/62505 | 10/2000 |

* cited by examiner

DEVICE-TO-DEVICE AUTHENTICATION SYSTEM, DEVICE-TO-DEVICE AUTHENTICATION METHOD, COMMUNICATION APPARATUS, AND COMPUTER PROGRAM

TECHNICAL FIELD

The present invention relates to a device-to-device authentication system, a device-to-device authentication method, a communication apparatus and a computer program, for authenticating the authenticity of devices connected via a network, in particular, to a device-to-device authentication system, a device-to-device authentication method, a communication apparatus and a computer program, for authenticating the authenticity of devices connected on a home network connected to an external network via a router.

More specifically, the present invention relates to a device-to-device authentication system, a device-to-device authentication method, a communication apparatus and a computer program, for authenticating whether or not devices are connected within a certain scope, in particular, to a device-to-device authentication system, a device-to-device authentication method, a communication apparatus and a computer program, for authenticating whether or not one of the devices can use the contents legitimately acquired by the other device within the scope of private use allowed by the copyright law.

BACKGROUND ART

Owing to the recent diffusion of the Internet, various digital contents including a computer file are actively distributed on a network. Moreover, with the spread of a broadband communication network (xDSL (x Digital Subscriber Line), CATV (Cable TV), a wireless network or the like), a mechanism capable of transmitting the distribution of digital data such as music data, image data or electronic publication and even rich contents such as a motion picture without giving any stresses to a user is now being arranged.

On the other hand, the distributed contents are digital data, and therefore, an unauthorized operation such as copy or falsification can be relatively easy to perform. Moreover, a fraud such as the copy or the falsification of the contents is currently frequently committed, which is a main cause of hampering the interest of a digital-content vendor. As a result, a vicious cycle that the price of the contents must be increased to result in the hindrance of diffusion is generated.

For example, recently, the technology of a computer, a network or the like is steadily spreading to general households. An information device such as a personal computer for home use or a PDA (Personal Digital Assistants) and, in addition, various information home appliances such as a television set and a video playback apparatus are interconnected via a home network. In many cases, such a home network is interconnected to an external broadband network including the Internet via a router. After the contents legitimately acquired from a server on the Internet are stored in a server on the home network (hereinafter, referred to as a "home server"), the contents are distributed via the home network to another in-home terminal (client).

Under the copyright law, the contents as copyright work are protected against unauthorized use such as unauthorized copy or falsification. On the other hand, an authorized user is allowed to copy the contents for private use, that is, for personal use, family use or other similar uses within a limited circle (see Copyright Law of Japan, Article 30).

If the scope of private use is applied to the above-described home network, the client terminal connected to the home network is supposed to be within the scope of personal use or family use. Therefore, it is considered that it is appropriate for the client terminal on the home network to make free use of the legitimately acquired contents in the home server (it is apparent that the number of terminals which can enjoy the contents is required to be limited to a certain number).

With a current technique, however, it is difficult to identify whether a client terminal logging into the home network is within the scope of private use or not.

For example, since the home network is interconnected to an external network via a router based on an IP protocol, the home server does not know where a client making access actually is. If the home server provides the contents to external (remote) access, the use of the contents is substantially unrestrained. Therefore, the copyright for the contents is almost unprotected. As a result, a content creator may lose the motivation of the creation.

Furthermore, if the home server allows the client terminal in the home network to use the contents in the same manner, the same client terminal logs into a plurality of home networks at time intervals. As a result, it can use the contents almost unrestrictedly.

On the other hand, if strict restrictions are imposed on the client terminal, a user cannot ensure the private use fundamentally allowed by the copyright law. As a result, the user cannot satisfactory enjoy the contents. Accordingly since the use of a home server or a content-distribution service is not well promoted, the development of content business itself may be impeded.

For example, in consideration of the fact that a user who legitimately purchases copyright work is allowed for free use of it, a method for more easily obtaining consent from an owner of the rights to the contents for the copy and the use of information on a network by the user has been proposed (see, for example, Japanese Patent Application Publication No. 2002-73861). However, this method classifies users depending on the level of relation with the owner of the rights to the use of information and distributes the information by a different distribution method for each level of the relation. This method does not identify the extent of the scope of private use on the network.

Furthermore, as a protocol constituting the home network, for example, an UPnP (registered trademark) has recently been known. The UPnP allows easy network construction without any complicated operations and allows a content-providing service between network-connected devices without any difficult operations and setting. Moreover, the UPnP is advantageous in that it is not dependent on an operating system (OS) and the addition of a device is easy.

In the UPnP, network-connected devices exchange a definition file described in an XML (extended Markup Language) format for mutual authentication. The outline of processing of the UPnP is as follows.

(1) Addressing process: its own device ID such as an IP address is acquired.

(2) Discovery process: each device on a network is searched so as to acquire information such as device type or a function contained in a response received from each device.

(3) Service request process: a request is made for a service to each device based on information acquired by the discovery process.

By such a processing procedure, a service can be provided and received using network-connected devices. A device to be connected to the network acquires a device ID by the addressing process and acquires information for other devices on the network by the discovery process, thereby enabling a service request.

The contents stored in the home server can be accessed from other devices on the home network. For example, the contents can be acquired by a device implementing the UPnP connection. If the contents are video data or audio data, a TV or a player is connected as a network-connected device so that a movie or music can be enjoyed.

However, in the device within the home network, for example, in the home server, the contents requiring copyright management such as private contents or pay contents are stored. Therefore, it is necessary to consider the countermeasure against unauthorized access.

It is natural that access from a device of a user having the rights to the use (a license) of the contents is allowed. However, in a home network environment interconnected to the external network via a home router, even a user without a license can get into the home network.

In order to exclude unauthorized access, for example, the home server is made to have a list of clients whose access is allowed so that collation with the list is executed each time access to the home server is requested from a client. In this way, unauthorized access can be excluded.

For example, MAC address filtering is known, which uses a MAC (Media Access Control) address corresponding to a physical address unique to each communication apparatus to set it as an access-allowable device list. More specifically, a MAC address of each device whose access is allowed is registered on a router or a gateway for isolating the internal network such as the home network and the external network from each other. A MAC address assigned to a received packet and the registered MAC address are collated with each other. Access from a device with an unregistered MAC address is refused (see, for example, Japanese Patent Application Publication No. 10-271154).

In order to construct the access-allowable device list, however, it is necessary to check the MAC addresses of all the devices connected to the internal network. Moreover, efforts to input all the acquired MAC addresses so as to create a list are required. Furthermore, in the home network, a connected device is relatively frequently changed. Therefore, the access-allowable device list has to be modified for each such change.

DISCLOSURE OF THE INVENTION

An object of the present invention is to provide preferable device-to-device authentication system, device-to-device authentication method, communication apparatus and computer program, which are capable of suitably authenticating the authenticity of devices connected on a home network connected to an external network via a router.

Another object of the present invention is to provide preferable device-to-device authentication system, device-to-device authentication method, communication apparatus and computer program, which are capable of suitably authenticating whether or not one of the devices can use the contents legitimately acquired by the other device within the scope of private use allowed by the copyright law.

The present invention is devised in view of the above problems. A first aspect thereof is a device-to-device authentication system for authenticating whether or not devices on a network are connected within a certain range, characterized in that: each of the devices interconnected via the network has a mediating device interface for physically accessing a mediating device such that the mediating device is removable, and local environment management means for authenticating that another device physically accessing the same mediating device within a predetermined period of time is located in a local environment where the contents are available; wherein use of the contents is allowed between the devices in the local environment.

However, a "system" herein means a logical assembly of a plurality of apparatuses (or functional modules for realizing a specific function), and each apparatus or functional module may be or may not be present in a single housing body.

One of the devices connected to a home network is a home server for legitimately acquiring the contents from the external network via the router or through package media or broadcast reception, whereas the other device is a client for making a request for the contents to the home server for use. In response to the confirmation of the presence of both the devices on the same home network, the home server provides the contents and/or issues a license for the contents to the client.

Under the copyright law, the contents as copyright work are protected against unauthorized use such as unauthorized reproduction or falsification. On the other hand, an authorized user of the copyright work is allowed to reproduce the contents for private use, that is, for personal use, family use or other similar uses in a limited circle.

Accordingly, in the present invention, on the assumption that a client terminal present at such close range that allows an mediating device to be physically passed within a predetermined period of time, that is, present in the local environment falls within the scope of private use, only a client that is authenticated to be under the local environment by the local environment management means can use the contents stored on a home server.

Two or more home servers can be installed on the home network. In such a case, since client terminals on the same home network are under the local environment, each home server registers them as members to form a group in an independent manner so as to distribute the contents and to issue a license for the use of the contents. Furthermore, the client terminal can be registered as a member simultaneously on two or more home servers on the same home network to belong to a plurality of groups so as to acquire a license of the contents from each of the home servers.

Also in this case, since the client terminal is under the local environment for each of the home servers and therefore is supposed to fall within the scope of personal or family use, it is appropriate for it to make free use of the contents of each of the home serves in the local environment.

On the other hand, even if the client terminal can be registered on a plurality of home server as a member at the same time, it should not be allowed to belong to a plurality of groups of home servers over a plurality of home networks at time intervals. This is because the connection to another home network corresponds to the move of the client terminal to a remote environment for the first connected home network or the connection to one home network is equivalent to the presence of the client terminal in a remote environment for the other home networks.

Therefore, a client can use the contents acquired from a plurality of home servers on the same home network, however, upon connection to a home server on another home network, the client cannot use the contents acquired from the home servers on the home network other than currently connected.

A current network protocol does not provide any mechanisms for identifying whether or not the devices interconnected via the network are authentic, that is, they can privately use the contents within the scope of personal or family use. Therefore, in view of the fact that the devices connected on the home network are located in home, that is, at close range and therefore a user can physically access the devices within a relatively short period of time, the local environment management means identifies whether or not the devices are present under the same local environment based on whether or not the devices can share the access to the same physical medium within a short period of time.

For example, in the case where a mediating device capable of retaining predetermined identification information is used, the local environment management means can authenticate that each of the devices is in the local environment based on the fact that each of the devices physically accessing the mediating device reads the same identification information from the mediating device and/or that time at which each of them reads the identification information is within a predetermined period of time.

Moreover, in the case where a mediating device including a tamper-resistant memory for retaining confidential information in a secure manner is used, at least one device has a function of generating confidential information in the form of random number or in the other forms. The local environment management means can authenticate that each of the devices is located in the local environment based on the fact that the confidential information generated from a single device can be acquired by another device via the mediating device within a predetermined period of time.

At this time, the device generating the confidential information may allow the confidential information to erase after elapse of a predetermined period of time. In this case, the local environment management means can authenticate a device, which is capable of sharing the confidential information prior to the loss of the confidential information in the device generating the confidential information, is located in the local environment.

A second aspect of the present invention is a computer program described in a computer-readable format so as to execute a process, on a computer system, for authenticating whether or not devices on a network are connected within a certain scope, characterized in that: each of the devices interconnected via the network including a mediating device interface for physically accessing a mediating device such that the mediating device is removable, the computer program, characterized by including: a local environment management step of authenticating that another device physically accessing the same mediating device within a predetermined period of time is located in a local environment allowing use of the contents; and a content-using step of allowing the use of the contents between the devices in the local environment.

The computer program according to the second aspect of the present invention defines a computer program described in a computer-readable format so as to realize a predetermined process on a computer system. In other words, by installing the computer program according to the second aspect of the present invention on a computer system, a cooperative function is demonstrated on the computer system. As a result, the same effects as those of the device-to-device authentication system according to the first aspect of the present invention can be obtained.

The other objects, features and advantages of the present invention will be apparent from the detailed description based on the following embodiments of the present invention and the accompanying drawings.

BRIEF DESCRIPTION OF DRAWINGS

FIG. 6 is a diagram schematically showing a hardware structure of a host apparatus connected to the home network as a server, a client or the like;

BEST MODE FOR CARRYING OUT THE INVENTION

Hereinafter, embodiments of the present invention will be described in detail with reference to the drawings.

Under the copyright law, the contents as copyright work are protected against unauthorized use such as unauthorized reproduction or falsification. On the other hand, an authorized user of the copyright work is allowed to reproduce the contents for private use, that is, for personal use, family use or other similar uses in a limited circle (see Copyright Law of Japan, Article 30).

On the assumption that a client terminal in a home network (hereinafter, also referred to as a "local environment") falls within the scope of private use, the inventors of the present invention propose a system in which only a client under the local environment can use the contents stored on a home server.

Herein, the definition of the local environment will be described.

Figure 1:
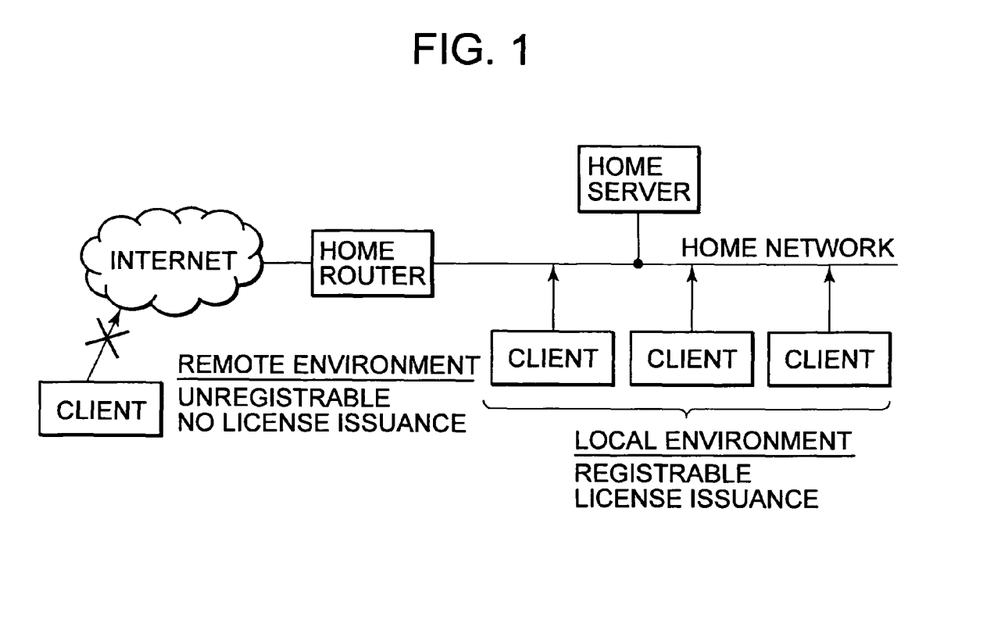
FIG. 1 is a diagram schematically showing a basic structure of a home network.

FIG. 1 schematically shows a basic structure of a home network. As shown in the drawing, a home network installed in home is connected to an external network such as the Internet via a home router.

On the home network, a home server and at least one client terminal are present. The home server legitimately acquires and stores the contents from a content server on the external network via the home router to distribute the contents in home. It is apparent that the home server can acquire the contents by means other than the network, such as package media or broadcast reception. Each client terminal makes a request for desired contents to the home server so as to acquire them for use.

The client terminals connected to the home network are present under the local environment, and it is supposed that they are within the scope of personal or family use. Therefore, it is considered that it is appropriate for the client terminals on the home network to make free use of the contents legitimately acquired on the home server.

Accordingly, the home server registers the client terminals under the local environment as members and issues a license for the contents distribution and the use of the contents. It is apparent that the number of terminals capable of enjoying the contents is required to be limited to a certain number.

Under the local environment, the client terminal acquires the contents from the home server, uses the contents such as for copy or streaming and can also take the contents out of the local environment (into a remote environment) for use.

On the other hand, a client terminal that is not present on the home network, that is, present in a remote environment, is not considered to be within the scope of personal or family use. If the client terminal in the remote environment is allowed to use the contents, the use of the contents is substantially unrestrained. As a result, the copyright for the contents is almost unprotected. Therefore, the home server neither registers the client in the remote environment as a member nor issues a license of the contents.

In the example shown in FIG. 1, only one home server is present on the home network. However, it is apparent that two or more home servers may be installed on the same home server so that each of the home servers independently provides a distribution service of the contents in the home network.

Figure 2:
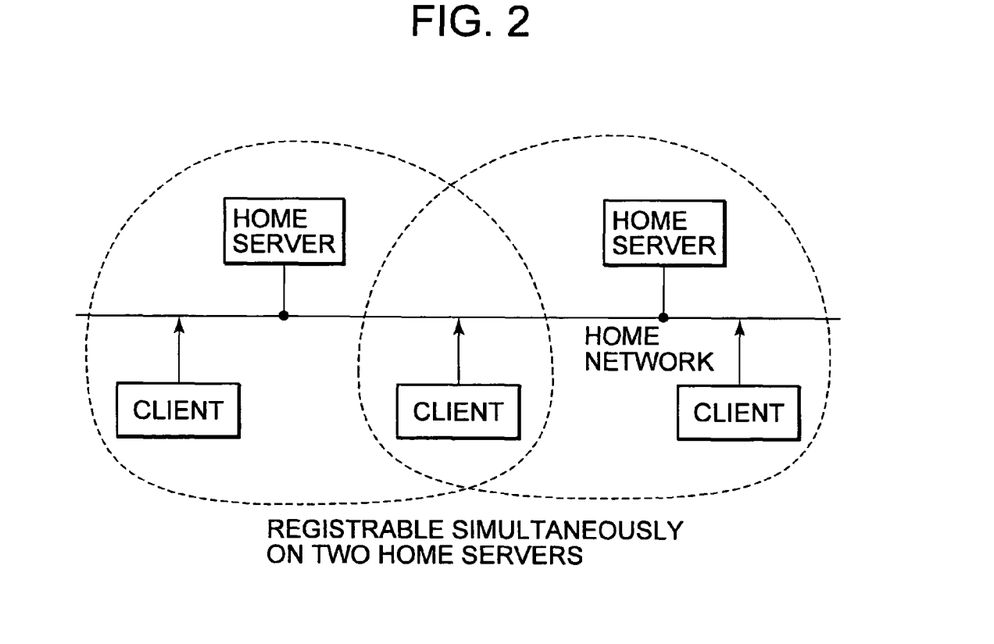
FIG. 2 is a diagram showing an exemplary structure of a home network on which two home servers are present.

FIG. 2 shows an exemplary structure of the home network on which two home servers are present.

In this case, since client terminals on the same home network are under a local environment, each of the home servers independently registers them as members to form a group so as to distribute the contents and to issue a license for the use of the contents. The client terminal acquires the contents from the home server, uses the contents such as for copy or streaming and can also take the contents out of the local environment (into a remote environment) for use.

Furthermore, the client terminal can be registered simultaneously on two or more home servers on the same home network as members to belong to a plurality of groups and can acquire a license of the contents from each of the home servers. In this case, the client terminal is also present under the local environment for the respective home servers and therefore it is supposed that it is within the scope of personal or family use. Therefore, it is considered that it is appropriate for the client to make free use of the contents of each of the home servers in the local environment.

Figure 3:
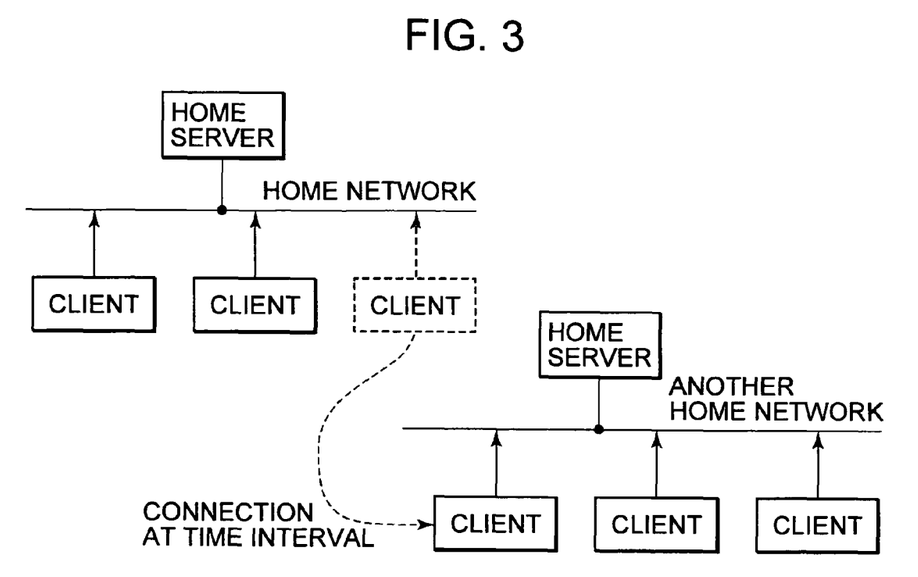
FIG. 3 is a diagram showing a state where a client terminal is connected to a plurality of home networks.

On the other hand, even if the client terminal can be registered on a plurality of home server as a member at the same time, it should not be allowed to belong to a plurality of groups of home servers over a plurality of home networks at time intervals (see FIG. 3).

The connection to another home network is corresponding to the move of the client terminal to a remote environment for the first connected home network or the connection to one home network is equivalent to the presence of the client terminal in a remote environment for the other home networks. The local environment is within the personal or family scope, whereas the remote environment departs from the personal or family scope.

It is technically possible for the client terminal to be connected to a plurality of home networks at time intervals. However, if the use of the contents is successively allowed with the connection, the use of the contents is substantially unrestrained. As a result, the copyright for the contents is almost unprotected.

Summarizing the above, in order to realize a local environment that is supposed to be within the scope of personal or family use on the home network, the followings are derived as necessary conditions.

(1) The home server does not allow member registration from outside of the home network; and (2) When two or more home servers are present in the same home network, member registration and group management are performed for each of the home servers. Each of the clients on the home network can be registered on two or more home servers. However, the home servers simultaneously accepting the registration must be present in the same home network.

In order to realize such a local environment, a mechanism for identifying whether or not the home server and the client terminal are present on the same home network is required between them.

A current network protocol does not provide any mechanisms for identifying a network, such as a home network, by segment. Therefore, in view of the fact that the devices connected to the home network are located in home, that is, at close range so that a user can physically access the devices within a relatively short period of time, the inventors of the present invention propose a method of identifying whether or not a home server for distributing the contents and a client terminal using the contents are connected to the same home network based on whether or not they can share access to the same physical medium within a short period of time.

As the physical access generated for two devices within a short period of time, which is herein mentioned, the insertion/removal of a recording medium inserted into a device through an interface such as a USB (Universal Serial Bus) or a memory stick in a standard manner or a reading/writing operation from/to a non-contact IC card can be used. Alternatively, by near field data communication such as IrDA or by reducing the electric power of a communication device in compliance with IEEE 802.11 so as to limit the communication range, the physical access generated for two devices within a short period of time can be used instead.

Hereinafter, embodiments of the present invention will be described in detail with reference to the drawings.

Figure 4:
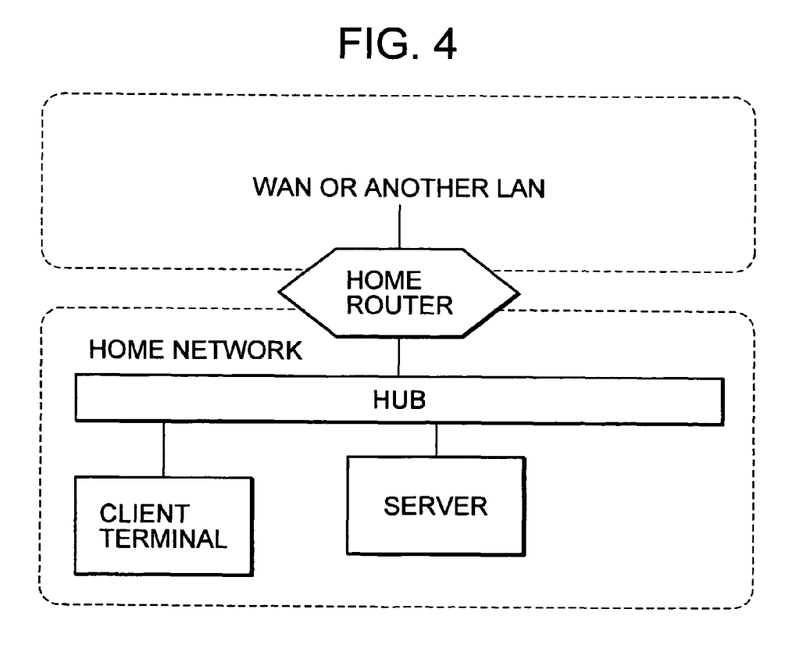
FIG. 4 is a diagram schematically showing a structure of a home network according to one embodiment of the present invention.

FIG. 4 schematically shows a structure of a home network according to an embodiment of the present invention.

A home network installed in home is connected to a WAN such as the Internet or another LAN via a home router. The home router is set as a default gateway of the home network.

The home network is constituted by, for example, connecting LAN cables of two or more host apparatuses such as a home server and a client terminal to a hub (concentrator).

The host apparatuses on the home network, such as the home server, the client terminal and the home router, and a host apparatus on the external network have MAC addresses, each being unique to a device. The host apparatus transmits and receives a packet including header information containing a destination MAC address and a source MAC address, for example, an Ethernet (registered trademark) frame via the network.

The host apparatuses on the home network, such as the home server and the client terminal, are constituted as, for example, UPnP-compatible devices. In this case, the addition and the deletion of a connected device to/from the network are easy. A device to be connected to the network can enjoy service on the home network such as the use of the contents in accordance with the following procedure.

(1) Addressing process: its own device ID such as an IP address is acquired.
(2) Discovery process: each device on a network is searched so as to acquire information such as device type or a function contained in a response received from each device.
(3) Service request process: A request for a service is made to each device based on information acquired by the discovery process.

On the home network, a local environment that is supposed to be within the scope of personal or family use is formed. Therefore, the home server legitimately acquires and stores the contents from a content server on the external network via the home router to distribute the contents in home. Each of the client terminals is allowed to make a request for desired contents to the home server so as to acquire them for use.

Under the local environment, the client terminal acquires the contents from the home server to use the contents such as for copy or streaming. Furthermore, it can take the contents out of the local environment (into the remote environment) for use.

Figure 5:
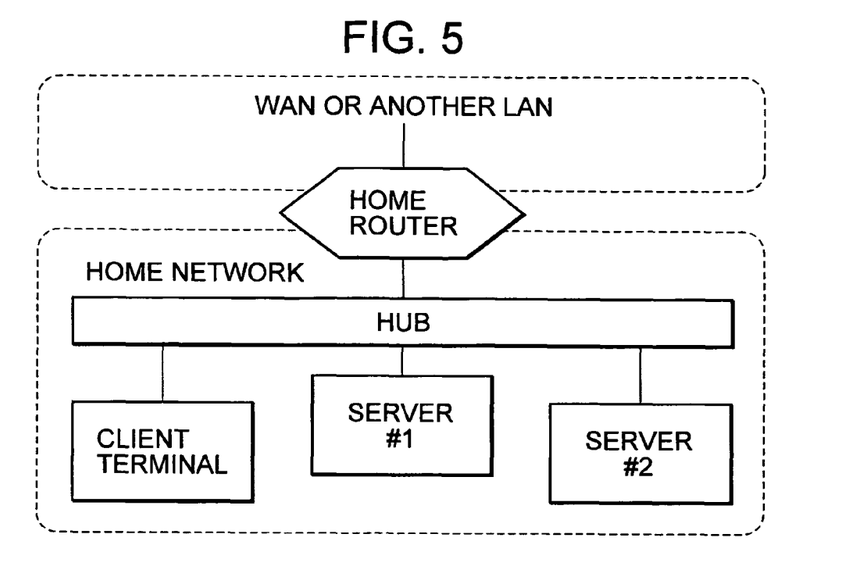
FIG. 5 is a diagram schematically showing a structure of a home network according to another embodiment of the present invention.

FIG. 5 schematically shows a structure of a home network according to another embodiment of the present invention.

The home network is connected to a WAN such as the Internet or another LAN via the home router. In this case, the home router is also set as a default gateway of the home network.

This differs from FIG. 4 in that two home servers are present on the home network. The respective home servers may be simultaneously present on the home network or may be connected at a time interval.

In this case, since the client terminals on the same home network are under the local environment, each of the home servers registers them as members to form a group so as to distribute the contents and to issue a license for the use of the contents. The client terminal acquires the contents from the home server, uses the contents such as for copy or streaming and can also take the contents out of the local environment (into a remote environment) for use. Furthermore, the client terminal can be registered simultaneously on two or more home servers on the same home network as members to belong to a plurality of groups so as to acquire a license of the contents from each of the home servers.

Figure 6:
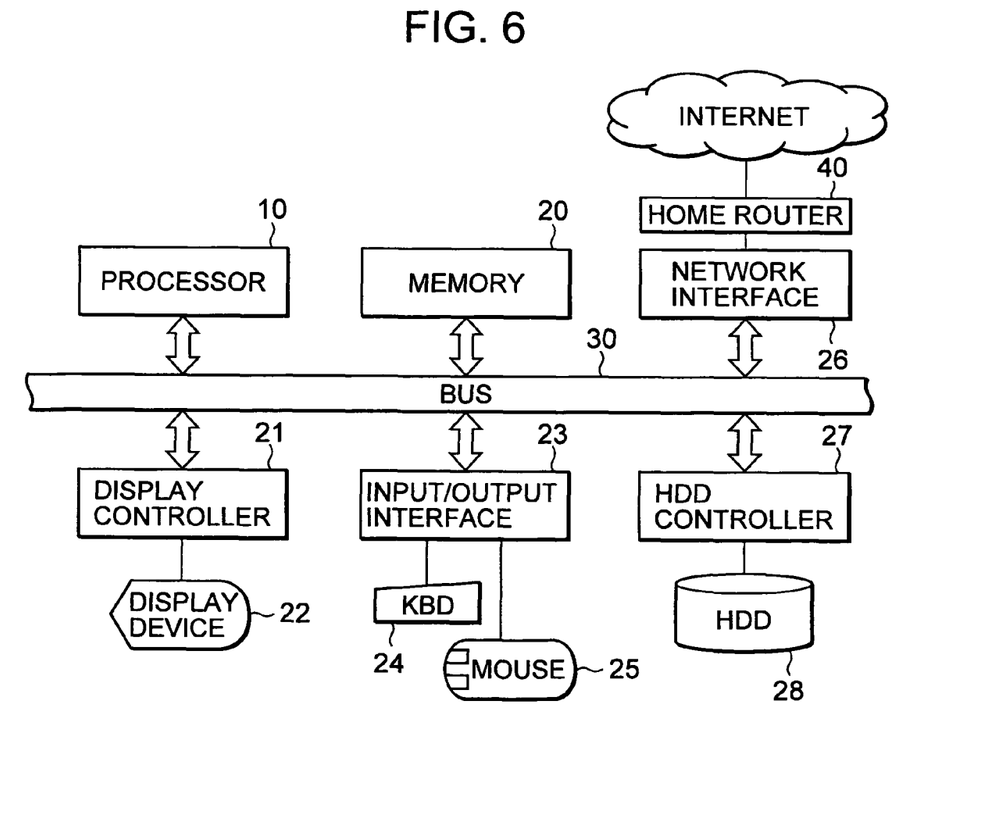

FIG. 6 schematically shows a hardware structure of a host apparatus connected to the home network as a server, a client or the like.

The system is constituted mainly of a processor 10. The processor 10 executes various processes based on a program stored in a memory. The processor controls various peripheral devices connected through a bus 30. The peripheral devices connected to the bus 30 are as follows.

A memory 20 is constituted of a semiconductor memory, for example, a DRAM (Dynamic RAM) or the like and is used to load a program code executed in the processor 10 or to temporarily store operation data of an execution program.

A display controller 21 generates a display image in accordance with a draw command sent from the processor 10 and transmits it to a display apparatus 22. The display apparatus 22 connected to the display controller displays and outputs the image on a screen in accordance with display image information transmitted from the display controller 21.

An input/output interface 23, to which a keyboard 24 and a mouse 25 are connected, transfers an input signal from the keyboard 24 or the mouse 25 to the processor 10.

A network interface 26 is connected to the external network such as a LAN or the Internet and controls data communication through the Internet. Specifically, it transfers data transmitted from the processor 10 to another apparatus on the Internet and receives data transmitted through the Internet so as to pass it to the processor 10.

A hard disk drive (HDD) controller 27, to which a high-capacity external storage apparatus 28 such as an HDD is connected, controls the input and output of data to the HDD 28 to which the HDD controller 27 is connected. The HDD 28 stores a program of an operating system (OS), an application program, a driver program and the like to be executed by the processor. The application program is, for example, a server application for authenticating each client terminal on the home network as the home server or for providing the contents or issuing a license, a client application for use of the contents such as for reproduction of the contents provided by the server or the like, and the like.

A mediating device interface 40 is an apparatus for allowing physical access to the same mediating device to be shared with another device in the local environment within a short period of time. As the mediating device, a recording medium to be inserted into a device through an interface in a standard manner such as a USB (Universal Serial Bus) or a memory stick or a non-contact IC card can be cited. The mediating device interface 40 is a media slot in the former case, whereas it is a card reading/writing apparatus in the latter case.

Since it is supposed that the devices whose access to the same mediating device occurs within a relatively short period of time are located at close range, that is, in the same home, they are considered to be in the local environment and therefore the reproduction of the contents is considered to be within the scope of personal or family use.

In order to constitute the host apparatus, a large number of electric circuits or the like are required in addition to those illustrated in FIG. 6. However, since they are known to those skilled in the art and do not constitute the gist of the present invention, they are omitted in this specification. Moreover, it should be understood that each connection between hardware blocks in the drawing is only partially illustrated in order to avoid the complication of the drawing.

Figure 7:
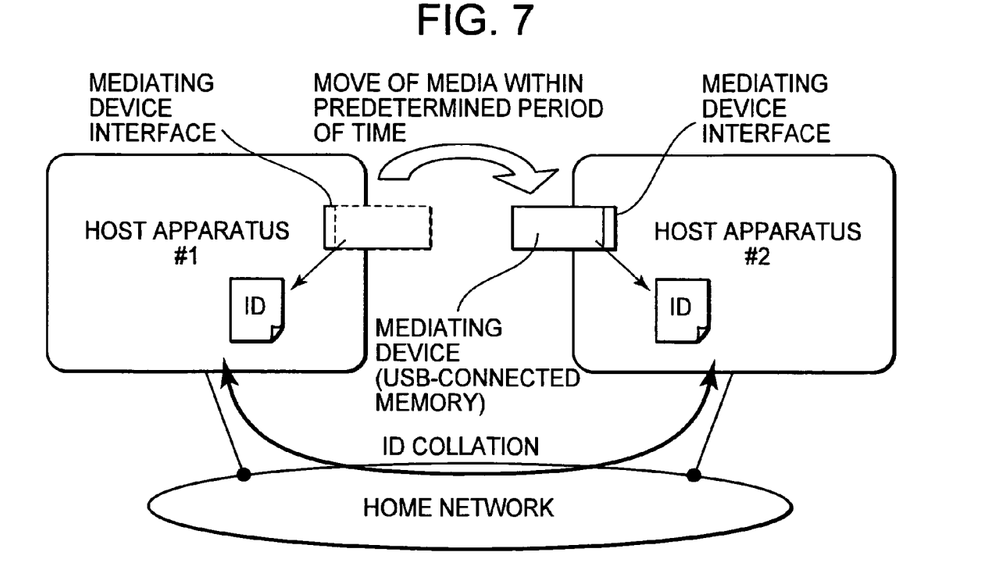
FIG. 7 is a diagram showing a state where a local environment is authenticated by using a mediating device between two host apparatuses that are connected through a network.

FIG. 7 illustrates a state where the local environment is authenticated between two host apparatuses connected through the network by using the mediating device.

The host apparatuses are a home server for distributing the contents and a client terminal using the contents. They are interconnected via the same home network, a WAN or other LANs.

For convenience of the description, it is assumed that the mediating device is an USB-connected memory device and the mediating device interface 40 is a USB port equipped for each of the host apparatuses in a standard manner.

If each of the host apparatuses is located in the local environment, that is, in the same home, an operation of inserting the USB-connected memory into one of the host apparatuses and then removing it therefrom so as to insert it into the other host apparatus can be completed within a relatively short period of time such as several tens of seconds or several minutes. Then, the host apparatuses collate the identification information respectively read from the USB-connected memory via the network and can confirm the physical access is made to the same mediating device. In this manner, if the contents are shared at close range allowing the mediating device to be passed within a short period of time, it is not considered to depart from the protected scope of the copyright.

When the USB-connected memory is inserted into the mediating device interface, a host apparatus #1 reads identification information therefrom and retains its read time. Then, the USB-connected memory is removed from the host apparatus #1 and inserted into the mediating device of the host apparatus #2. The host apparatus #2 also reads identification information from the USB-connected memory and retains its read time. Furthermore, the host apparatus #1 and the host apparatus #2 confirm that both the apparatuses are located at close range, that is, in the local environment based on the fact that they share the same identification information and the time at which the identification information is acquired is within a predetermined period of time (or the collation is successfully performed within a predetermined period of time after the acquisition of the identification information) through the communication via the network.

The use of the contents between the devices is allowed only in the thus formed local environment, thereby effectively restraining the unauthorized distribution of the contents.

In the example shown in FIG. 7, the authentication procedure of the local environment is implemented between two host apparatuses. Even in the case of three or more host apparatuses, it is apparent that all the apparatuses are supposed to be located in the same local environment and to be grouped together for use of the contents as long as the collation process through the mediating device such as the USB-connected memory can be realized within a predetermined period of time. However, if the grouping is allowed in an unrestrained manner, the contents are diffused and the possibility of failing to protect the copyright is raised. Therefore, the number thereof should be limited to a certain number.

Figure 8:
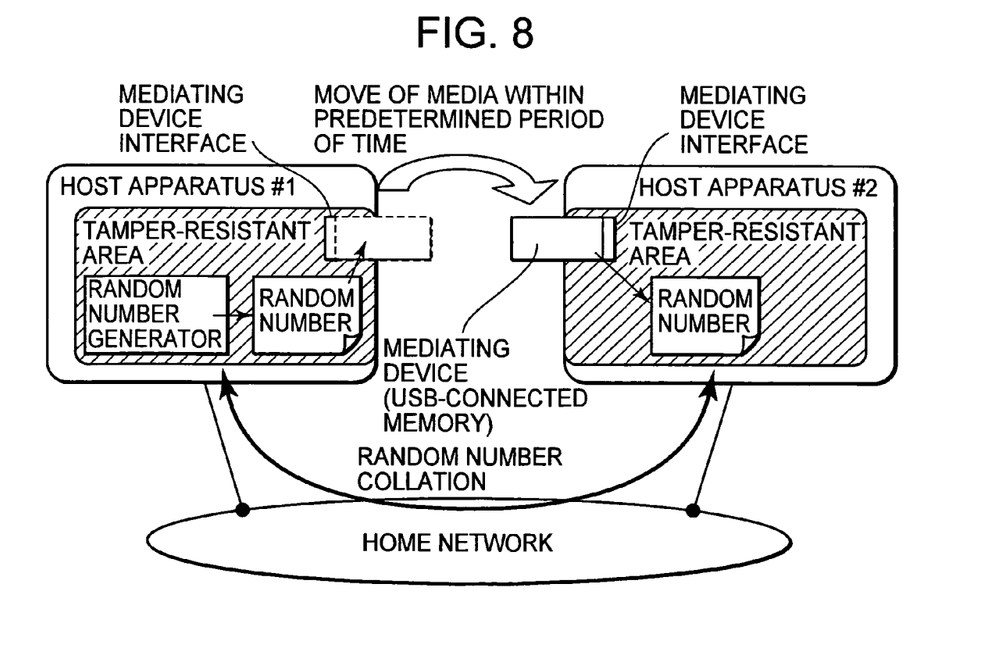
FIG. 8 is a diagram showing a variation of an authentication process of a local environment, implemented between the host apparatuses shown in FIG. 7.

FIG. 8 illustrates a variation for the authentication of the local environment between two network-connected host apparatuses by using the mediating device.

Since the USB-connected memory is not given protection against external access in the example shown in FIG. 7, a similar authentication procedure can actually be spoofed between host apparatuses, which are in the remote environment by duplicating the USB-connected memory having the same identification information.

On the other hand, in the example shown in FIG. 8, the mediating device interface 40 of each of the host apparatuses and the mediating device have tamper-resistance and therefore are protected against unauthorized external access. Moreover, fixed identification information is not stored in the USB-connected memory as the mediating device.

A mediating device interface 40-1 of one of the host apparatuses has a random number generator. Upon insertion of the USB-connected memory, it writes a generated random number to a tamper-resistant area in the memory. Then, the mediating device interface 40-1 retains the generated random number for a short period of time needed only to pass the USB-connected memory within close range.

Figure 9:
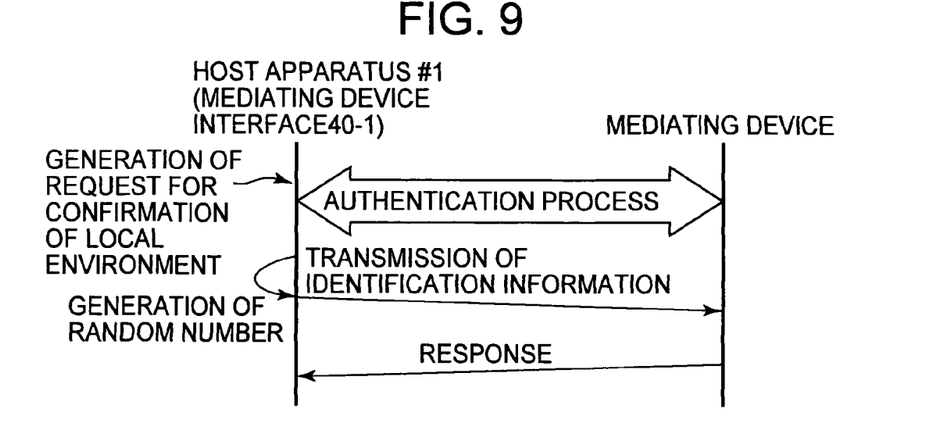
FIG. 9 is a diagram showing an operation sequence performed between a mediating device interface 40-1 and an mediating device.

FIG. 9 shows an operation performed between the mediating device interface 40-1 and the mediating device at this time. Upon generation of a request for confirmation of the local environment, a predetermined authentication process is first implemented between the mediating device interface 40-1 and the mediating device. Thereafter, the mediating device interface 40-1 transfers identification information (for example, a temporarily generated random number) to the mediating device. In response to it, the mediating device gives a response.

Thereafter, a user removes the USB-connected memory and inserts it into a mediating device interface 40-2 of the other host apparatus. The mediating device interface 40-2 accesses the USB-connected memory and reads the random number written thereto.

Figure 10:
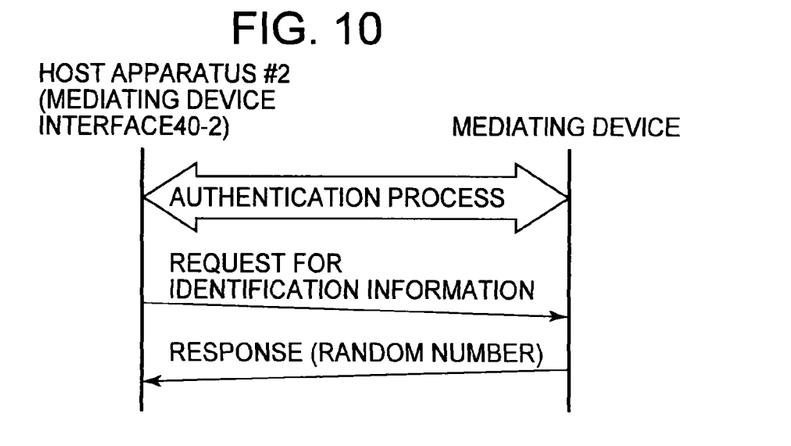
FIG. 10 is a diagram showing an operation sequence performed between a mediating device interface 40-2 and a mediating device.

FIG. 10 shows an operation implemented between the mediating device interface 40-2 and the mediating device at this time. Upon generation of a request for confirmation of the local environment, a predetermined authentication process is first implemented between the mediating device interface 40-2 and the mediating device. Thereafter, the mediating device interface 40-2 requests identification information (for example, a temporarily generated random number) to the mediating device. In response to it, the mediating device gives a response to the mediating device interface 40-2.

Thereafter, the respective host apparatuses collate the random numbers via the network and can confirm within a predetermined period of time that physical access is made to the same mediating device each other. In order that each of the host apparatuses confirms whether or not the physical access to the mediating device occurs within a predetermined period or time, for example, a method of storing the time of access to the mediating device made by each of the host apparatuses and comparing the respective access time, a method of allowing the random number to be erased by the host apparatus generated the random number after elapse of a predetermined period of time and confirming via the network that the host apparatuses share the same random number until the random number is lost, and the like can be used.

Figure 11:
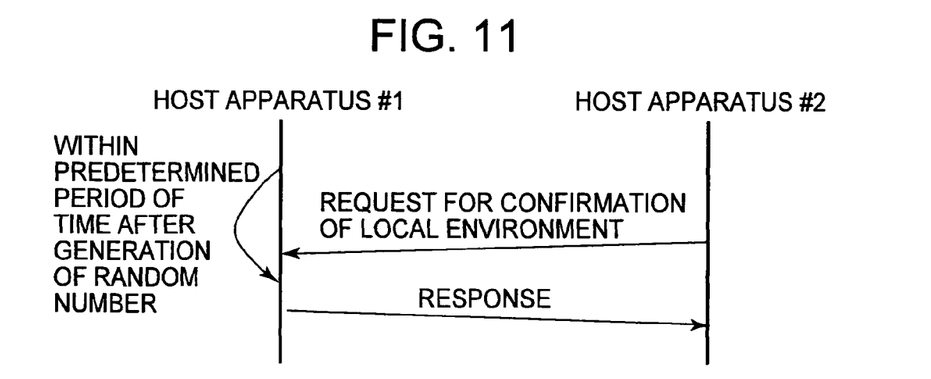
FIG. 11 is a diagram showing an operation for performing a confirmation process of a local environment between a host apparatus #1 and a host apparatus #2.

FIG. 11 shows an operation for implementing a confirmation process of the local environment between the host apparatuses #1 and #2. Upon reception of the random number from the USB-connected memory in a secure manner, the host apparatus #2 searches a host apparatus retaining the same random number on a LAN segment to which itself is connected. The search is made by, for example, broadcasting a local environment confirmation request packet containing the random number on the LAN. Then, when the host apparatus #1 receives a packet containing the same random number within a predetermined period of time after the generation of the random number or before the random number generated by itself loses, host apparatus #1 gives a response to it. As a result, the host apparatuses #1 and #2 confirm that they are located in the local environment.

The use of the contents between the devices is allowed only in the thus formed local environment, thereby effectively restraining the unauthorized distribution of the contents.

Even if the contents are shared at close range allowing the mediating device to be passed within a short period of time as described above, it is not considered to depart from the protected scope of the copyright. Thereafter, an encryption key may be generated by using the random number passed through the USB-connected memory as type information so as to perform encryption communication.

In the example shown in FIG. 8, the authentication procedure of the local environment is implemented between two host apparatuses. However, it is apparent that, even in the case of three or more host apparatuses, all the apparatuses are supposed to be located in the same local environment and grouped together for use of the contents as long as the collation process through the mediating device such as the USB-connected memory can be realized within a predetermined period of time. However, if the grouping is allowed in an unrestrained manner, the contents are diffused and the possibility of failing to protect the copyright is raised. Therefore, the number of the host device should be limited to a certain number.

Supplement

The present invention has been described in detail above with reference to specific embodiments. However, it is obvious that those skilled in the art can modify or substitute the embodiments without departing from the gist of the present invention. Specifically, the present invention is disclosed only by way of example, and therefore the description of the specification should not be read as limitative. In order to determine the gist of the present invention, the claims should be taken into consideration.

INDUSTRIAL APPLICABILITY

According to the present invention, preferable device-to-device authentication system, device-to-device authentication method, communication apparatus and computer program, which are capable of suitably authenticating the authenticity of devices connected on a home network connected to an external network via a router, can be provided.

Moreover, according to the present invention, preferable device-to-device authentication system, device-to-device authentication method, communication apparatus and computer program, which are capable of suitably authenticating whether or not one of the devices can use the contents legitimately acquired by the other device within the scope of private use allowed by the copyright law, can be provided.

According to the present invention, the use of the contents is allowed between devices only in a local environment, so that the unauthorized distribution of the contents can be effectively restrained.

The invention claimed is:

1. A device-to-device authentication system for authenticating when devices on a network are connected within a certain range, comprising:
    a first device comprising:
       a first mediating device interface for physically connecting a removable mediating device, wherein the first device reads information from the removable mediating device or the first device stores the information in the removable mediating device when the mediating device is physically connected to the first mediating device interface,
    a second device comprising:
       a second mediating device interface for physically connecting the removable mediating device, wherein the second device reads the information from the removable mediating device or the second device stores the information in the removable mediating device when the mediating device is physically connected to the second mediating device,
    a network interface unit configured to receive a request for authentication over the network, and
    a local environment management unit configured to authenticate, based on the information from the mediating device, that the first device and the second device are connected within the certain range when it is determined that a time between the physical connection of the mediating device to the first mediating interface and the physical connection of the mediating device to the second mediating interface is within a predetermined period of time,
    wherein the first device can use content when the first device is authenticated.

2. The device-to-device authentication system according to claim 1, wherein:
    the second device is a home server,
    the first device is a client for making a request for the content to the home server; and,
    in response to authentication of the client, the home server provides the content and/or issues a license for the content to the client.

3. The device-to-device authentication system according to claim 1, wherein:
    two or more home servers are able to be installed on the network; and
    at least one of the home servers provides the content and/or issues a license for the content to a client that is authenticated.

4. The device-to-device authentication system according to claim 3, wherein the client is able to be receive provision of the content and/or issuance of the license from at least one of the two or more home servers on the network.

5. The device-to-device authentication system according to claim 3, wherein upon connection to a home server on a second network, the client is not able to use the content from the two or more home servers.

6. The device-to-device authentication system according to claim 1, wherein the information comprises predetermined identification information for determining that the first and the second device have connected to the removable mediating device within the predetermined period of time.

7. The device-to-device authentication system according to claim 1, wherein:
    the information comprises confidential information for determining that the first and the second device have connected to the removable mediating device within the predetermined period of time; and
    the removable mediating device comprises a memory for retaining the confidential information in a secure manner.

8. The device-to-device authentication system according to claim 7, wherein the confidential information is erased after the predetermined period of time elapses.

9. A device-to-device authentication method for authenticating when devices on a network are connected within a certain range, comprising:
    physically connecting a removable mediating device to a first physical mediating device interface of a first device, wherein either the first device reads information from the removable mediating device or the first device stores the information in the removable mediating device, when the mediating device is physically connected to the first mediating device interface;
    physically connecting the removable mediating device to a second physical mediating device interface of a second device, wherein either the first device reads information from the removable mediating device or the first device stores the information in the removable mediating device, when the mediating device is physically connected to the first mediating device interface;
    receiving a request for authentication over the network;
    authenticating, base on the information from the removable mediating device, that the first device and the second device are connected within the certain range when it is determined that a time between the physical connection of the mediating device to the first physical mediating interface and the physical connection of the mediating device to the second physical mediating interface is within a predetermined period of time; and
    allowing the first device to use content when the first device is authenticated.

10. The device-to-device authentication method according to claim 9, wherein:
    the second device is a home server,
    the first device is a client for making a request for the content to the home server; and, in response to authentication of the client, the home server provides the content and/or issues a license for the content to client.

11. The device-to-device authentication method according to claim 9, wherein:
two or more home servers are able to be installed on the network; and
at least one of the home servers provides the content and/or issues a license for the content to a client that is authenticated.

12. The device-to-device authentication method according to claim 11, wherein the client is able to be receive provision of the content and/or issuance of the license from at least one of the two or more home servers on the network.

13. The device-to-device authentication method according to claim 11, wherein upon connection to a home server on a second network, the client is not able to use content from the two or more home servers.

14. The device-to-device authentication method according to claim 9, wherein storing information in the removable mediating device further comprises:
storing predetermined identification information, for determining that the first and the second device have connected to the removable mediating device within the predetermined period of time, in the removable mediating device.

15. The device-to-device authentication method according to claim 9, wherein storing information in the removable mediating device further comprises:
storing confidential information, for determining that the first and the second device have connected to the removable mediating device within the predetermined period of time, in a secure manner in the removable mediating device.

16. The device-to-device authentication method according to claim 15, wherein the confidential information is erased the predetermined period of time elapses.

17. The device-to-device authentication method according to claim 9, further comprising:
writing a temporary random number to the mediating device;
reading the temporary random number from the mediating device; and
collating the temporary random number.

18. A non-transitory computer-readable medium storing a program for causing a computer to execute a method for authenticating whether or not devices on a network are connected within a certain scope, the method comprising:
physically connecting a removable mediating device to a first physical mediating device interface of a first device, wherein either the first device reads information from the removable mediating device or the first device stores the information in the removable mediating device, when the mediating device is physically connected to the first mediating device interface;
physically connecting the removable mediating device to a second physical mediating device interface of a second device, wherein either the first device reads information from the removable mediating device or the first device stores the information in the removable mediating device, when the mediating device is physically connected to the first mediating device interface;
receiving a request for authentication over the network;
authenticating, based on information stored in the removable mediating device, that the first device and the second device are connected within a certain scope when it is determined that a time between the physical connection of the mediating device to the first device and the physical connection of the mediating device to the second device is within a predetermined period of time, and
allowing the first device to use content when the first device is authenticated.

* * * * *